Dec. 15, 1970 J. J. TOMLIN 3,548,175

ERROR DETECTOR FOR FREQUENCY CHANGERS

Filed Jan. 15, 1968 4 Sheets-Sheet 1

Inventor
James J. Tomlin
by Roberts Cushman & Grover
Att'ys.

3,548,175
ERROR DETECTOR FOR FREQUENCY CHANGERS
James J. Tomlin, Lexington, Mass., assignor, by mesne assignments, to LTV Electrosystems, Inc., Dallas, Tex., a corporation of Delaware
Filed Jan. 15, 1968, Ser. No. 697,959
Int. Cl. H03k *13/32*
U.S. Cl. 235—153 15 Claims

ABSTRACT OF THE DISCLOSURE

Errors in a frequency changer, e.g., a divider, are detected by circuitry which includes two frequency dividers having a division ratio prime relative to the division ratio of the monitored frequency divider, and a coincidence gate. Input and output frequencies of the monitored divider are divided one in each of the detector dividers and applied to the coincidence gate, the gate being inhibited by the signal from the detector divider receiving the higher frequency signal. Non-coincidence of the signals applied to the gate produces an output triggering an alarm. An arbitrarily high probability of error detection is obtained by adding, for successive iterations, more detector circuits similar to those outlined above, the dividers of which have ratios prime relative to one another and to the monitored frequency divider, and the gate outputs of which trigger an alarm.

BACKGROUND OF THE INVENTION

This invention relates to the field of frequency dividers such as of the digital pulse counting type and to means for detecting random errors therein, caused, for example, by noise.

One known technique for determining if a miscount error has occurred is to utilize two identical divider circuits and compare outputs from the two systems. Although this technique will provide an indication of a miscount, it requires complete duplication of the divider circuit and is incapable of indicating which divider has miscounted. Only at the expense of yet another divider circuit is it possible to obtain an indication of which divider has miscounted, by a "majority vote" determination.

SUMMARY OF THE INVENTION

The present invention has, among others, the object of detecting a miscount in a divider circuit with a minimum of additional circuit elements, with convenient adaptability to make the probability of error detection arbitrarily high.

For monitoring a frequency changer to which a signal of a given input frequency is applied and from which a signal of output frequency emanates with an intended input to output frequency ratio of $n$, the error detector according to the invention utilizes a first frequency divider for dividing the signal of higher frequency and a second frequency divider for dividing the signal of lower frequency. The divider ratios are prime relative to $n$ and the period of the signal from the second divider is the shortest period common to signals from the two dividers. Indicating means are responsive to uninhibited signals from the second divider, and means are provided for inhibiting signals from the second divider during signals from the first divider.

These and other objects and aspects of the invention will appear from the following description of its principle and mode of operation, and of several practical embodiments.

DESCRIPTION OF THE PREFERRED EMBODIMENTS

Figure 1:
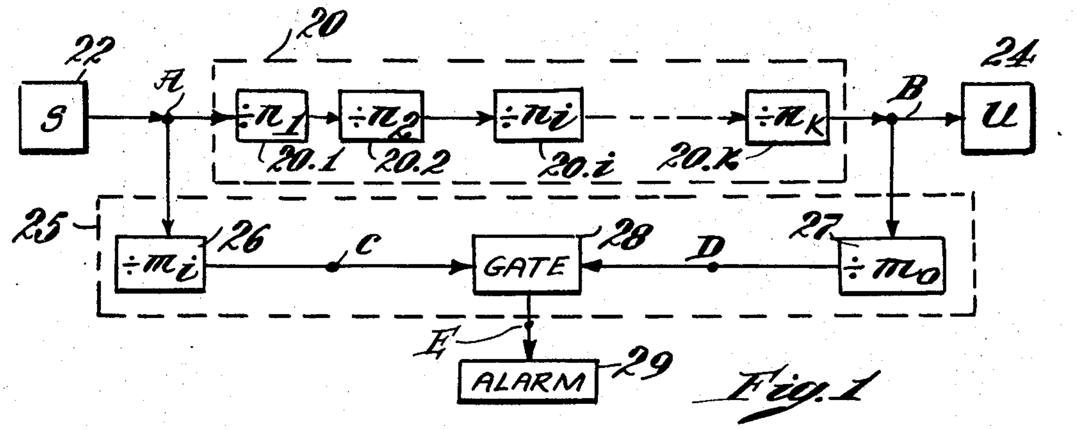
FIG. 1 is a schematic diagram of one embodiment of the invention.

FIG. 1 illustrates the basic principles of the invention. A frequency changer 20, here a frequency divider of the digital pulse-counting type, has a pulse signal of input frequency $f_i$ applied to input terminal A from a source 22. The divider 20 comprises a series of $k$ counting circuits 20.1, 20.2 . . . 20.*i*, . . . 20.*k*, each associated with an arbitrary division ratio $n_i$, $i=1,2 \ldots k$. Divider 20 therefore has a net division ratio $n$ given by $$n = \prod_{i=1}^{k} n_i$$

The output of divider 20, appearing at output terminal B for use in utilization apparatus 24, is thus a pulse signal of output frequency $f_o$, where $f_o=f_i/n$ if no errors occur.

To detect the presence of errors, which result from miscounts due to noise, for example, an error detector 25 according to the invention is provided. Error detector 25 comprises an input frequency divider 26 with a division ratio $m_i$, and an output frequency divider 27 with a division ratio $m_o$, which divide the input and output signals of divider 20 appearing at terminals A and B respectively. Dividers 26 and 27 are also of the pulse-counting type, and therefore the signal at point D, derived from output divider 27, will be a pulse signal with frequency $f_o/m_o$. Likewise, the signal at point C, derived from input divider 26, will be a pulse signal with frequency $f_i/m_i$. The signals at points C and D are applied to a coincidence gate 28 in which the lower frequency signal at D is inhibited by the higher frequency signal at C and which has an output at E of uninhibited D pulses for activation of an alarm 29.

According to the invention, the division ratios $m_i$ and $m_o$ are "prime relative to" each of the $n_i$ and therefore to $n$. "Prime relative to" in this context means that for two integers $x$, $y$, the $x$ is prime relative to $y$ if there exist no non-unity integers $a$, $b$, $c$ such that $x=ac$, $y=bc$, or in other words, $x$ and $y$ have no factor in common except unity. Thus, the division ratios $m_i$ and $m_o$ have no factor in common with any of the $n_i$ of the divider 20, and hence have no factor in common with the ratio $n$ of the divider 20. Selection of values for $m_i$ and $m_o$ will be dependent on other requirements and will be discussed below.

The operation of the circuit is most easily understood when $m_i = m_o = m$. The fundamental period of the signal at point D is $$\tau_D = \frac{mn}{f_i}$$

The fundamental period of the signal at point C is $$\tau_C = \frac{m}{f_i}$$

Since $m$ has no factor in common with $n$, the shortest common period is the period of the signal at D, or $mn/f_i$. If dividers 26 and 27 are set to begin counting at the some time, coincidence of pulses in the D and C signals in the absence of divider miscount will occur every $mn/f_i$ seconds. Lack of such coincidence, as detected by the gate 28, is an indication of divider miscount.

A single miscount in any one stage, for example the $p$ stage of divider 20, will result in a time displacement of $$t_s = \left( \prod_{i=1}^{p} n_i \right) / f_i \text{ seconds}$$

Because of the relationship between $n$ and $m$ (no factor in common), such a single miscount will destroy the next coincidence, and the uninhibited D signal passing through gate 28 will activate alarm 29. Multiple miscounts will also destroy coincidence and activate the alarm 29 if they produce a net time shift at point D unequal to $\pm qm/f_i$ second during the period $mn/f_i$, where $q$ is an integer. Such errors will be detected within $mn/f_1$ seconds of their occurrence, which is the maximum time needed to await the next test of coincidence in gate 28.

Selection of $m$, as can be deduced from the forgeoing, affects the operation of the circuit. Larger $m$ increase the probability that multiple errors will be detected, but also increase the maximum time lape between an error and its detection. Conversely, smaller $m$ provide quicker detection at the expense of lower probability of detection. As will be later explained, however, an iterative circuit may be used to provide a probability of detection arbitrarily high without sacrificing speed of detection.

It can also be seen from the foregoing that $m_o$ need not be equal to $m_i$. The circuit will detect errors in frequency changer 20 if $m_o = am_i$, where a is an integer. In this case, where a $>1$, the detector 25 will detect all errors which do not produce a net time shift of $$\pm \frac{q}{a} \frac{m_o}{f_i}$$

seconds during the fundamental period $m_o n/f_i$. Since $q/a < q$ for $a > 1$, the probability of error detection may be reduced somewhat in this case with no corresponding increase in speed of detection, and therefore it is preferable that $m_o = m_i = m$. For simplicity of illustration hereinafter, $m_o$ will be considered equal to $m_i$, although it will be understood that $m_o = am_i$ is workable.

Figure 2:
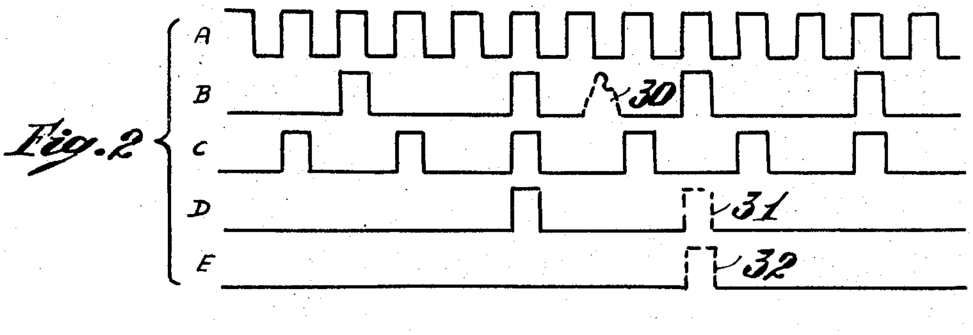
FIG. 2 is a graph indicating signals at various points in the schematic of FIG. 1.

FIG. 2 illustrates the signals at points A, B, C, D and E in the above described circuit for the simple case of $f_i = 12$ Hz. $n = 3$, $$f_o = \frac{f_i}{n} = 4 \text{ Hz.}$$

$m_o = m_i = 2$. The signal of A at 12 Hz. is divided by divided 26 to produce a signal at C of 6 Hz. The signal at B of 4 Hz. is divided by divider 27 to produce a signal at D of 2 Hz. The signals at C and D are compared in gate 28. An erroneous pulse 30 appearing in signal B through noise, for example, will be counted by divider 27 and there will result a pulse 31 at point D which is non-coincident with the pulses at point C. Gate 28 will pass this pulse as 32 to point E and alarm 29 will be activated to indicate the miscount. A missing pulse at B, or a phase-misplaced pulse at B caused by miscount (not shown) will also cause non-coincidence and activate the alarm.

The error detector 25 will not detect random errors of the kind producing a net time shift of $\pm qm/f_i$ seconds in a $mn/f_i$ second interval, nor will it detect a systematic error of $q$ miscounts per second. The latter case, however, corresponds to an incorrect division ratio and can be detected by other means. As hereinafter explained, the former case can be improved upon to an arbitrarily high degree through iteration of error detectors 25.

Figure 3:
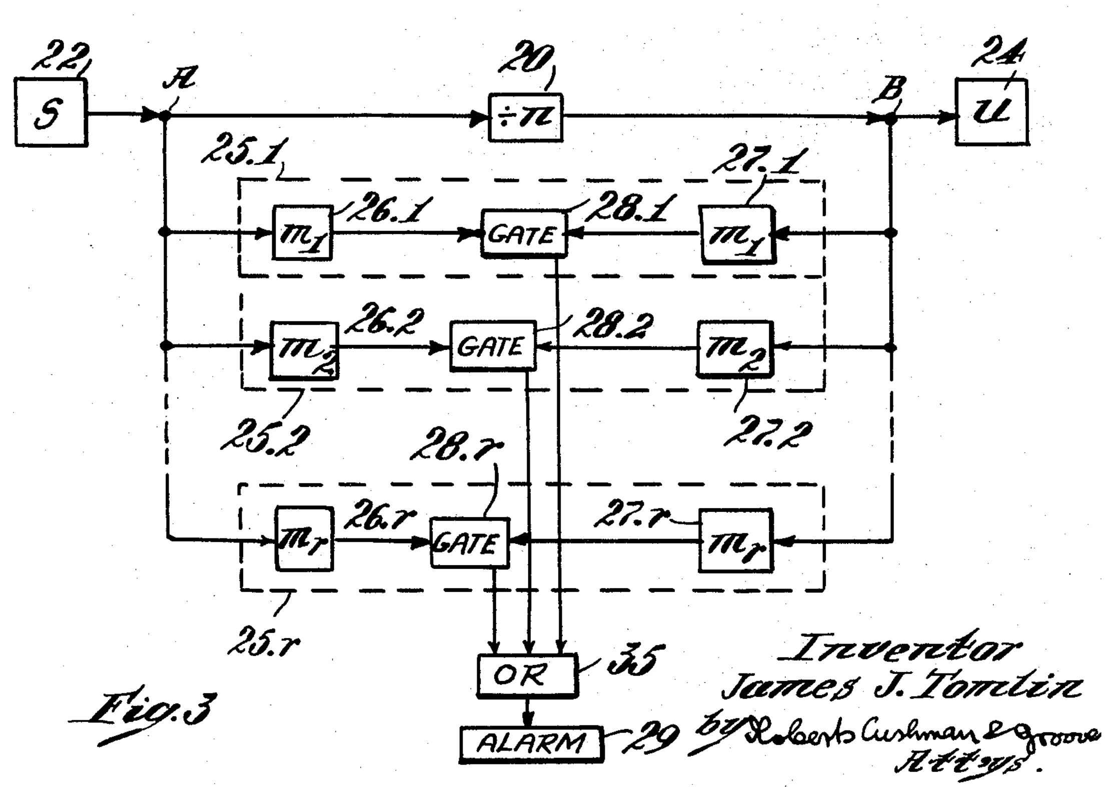
FIG. 3 is a schematic diagram of a second embodiment of the invention.

FIG. 3 illustrates an iterative circuit used to increase the probability of error detection. As in FIG. 1, a frequency divided 20 with division ration $n$ accepts an input signal of frequency $f_i$ at input terminal A from source 22, and sends an output signal of frequency $f_o = f_i/n$ from output terminal B to utilization apparatus 24. A plurality, $r$ in number, of detectors 25.1, 25.2 . . . 25.$r$, similar to detector 25, are employed. The detectors 25.1 . . . 25.$r$ have input frequency dividers 26.1 . . . 26.$r$ with division ratios $m_1 \ldots m_r$; output frequency dividers 27.1 . . . 27.$r$ with division ratios $m_1 \ldots m_r$; and coincidence gates 28.1 . . . 28.$r$, respectively. The outputs from coincidence gates 28.1 . . . 28.$r$ are fed to an OR gate 35, the output of which activates an alarm 29. Each detector, such as 25.$r$, will activate the alarm whenever the net time shift of an error is unequal to $\pm qm_r/f_i$ during the period $m_r n/f_i$. By choosing $m_1$, $m_2 \ldots m_r$ so that they have no factor in common with $n$, nor with each other, it can be seen that only errors which will escape detection are those which produce a net time shift of $$\pm \left( q \prod_{j=1}^{r} mj \right) / f_i$$

during the shortest period $m_i n/f_i$. By increasing the number of detectors, the probability of error detection can be made arbitrarily high.

The foregoing description assumes that the frequency changer 20 is perfect, having a pulse output composed of every $n$th pulse of the input, which can be superimposed on the pulse input with no change in phase or width of corresponding pulses. Moreover, it assumes that the dividers 26 and 27 pass every $n$th pulse unchanged in phase or width. In many cases these assumptions are valid; however, where they are not, changes in pulse phase or width can be compensated where necessary.

Figure 4:
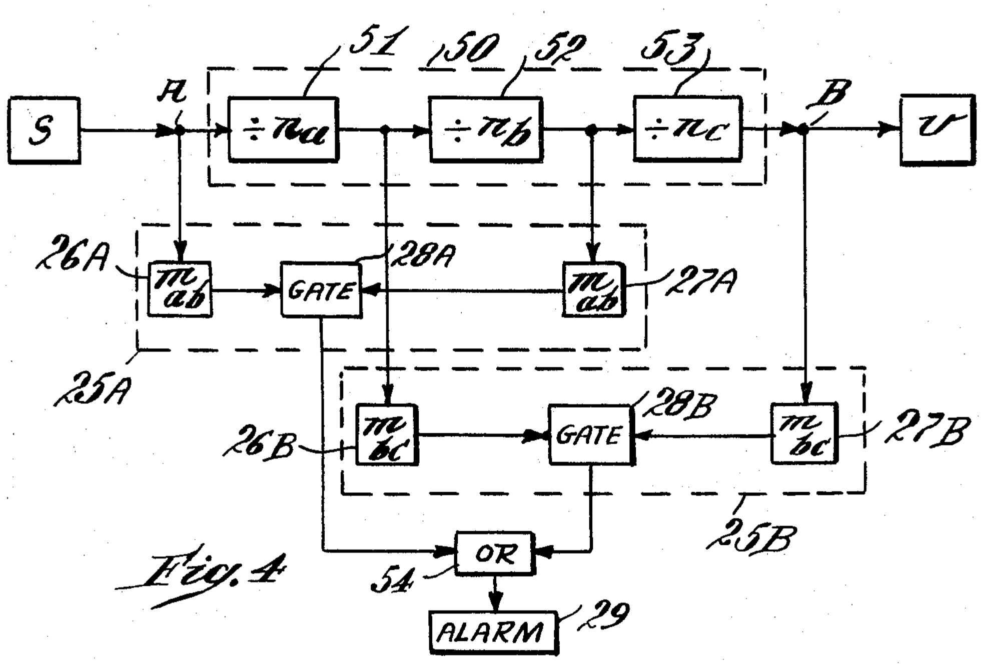
FIG. 4 is a schematic diagram of a third embodiment of the invention.

FIG. 4 illustrates one approach to compensating for "jitter" or phase uncertainty in a divider 50 comprising serial stages 51, 52 and 53 in which the cumulative effect of jitter through the whole divider makes comparison of signals impossible. Here two error detectors 25A and 25B, similar to detector 25 described previously, monitor serial portions of the divider 50 which have acceptably low jitter, detector 25A monitoring stages 51 and 52, and detector 25B monitoring stages 52 and 53. The dividers 26A and 27A of detector 25A have division rates of $m_{ab}$. The dividers 26B and 27B of detector 25B have division ratios of $m_{bc}$. The ratio $m_{ab}$ is prime relative to the division ratio through stages 51 and 52, and the ratio $m_{bc}$ is prime relative to the division ratio through stages 52 and 53. The coincidence gates 28A and 28B of the detectors have their outputs fed to an OR gate 54 which controls alarm 29, thus indicating an error in any stage of the divider 50. As illustrated, detectors 25A and 25B overlap, both monitoring stage 52. Such overlap insures that no spurious signal originating in connections between stages will go undetected.

Figure 5:
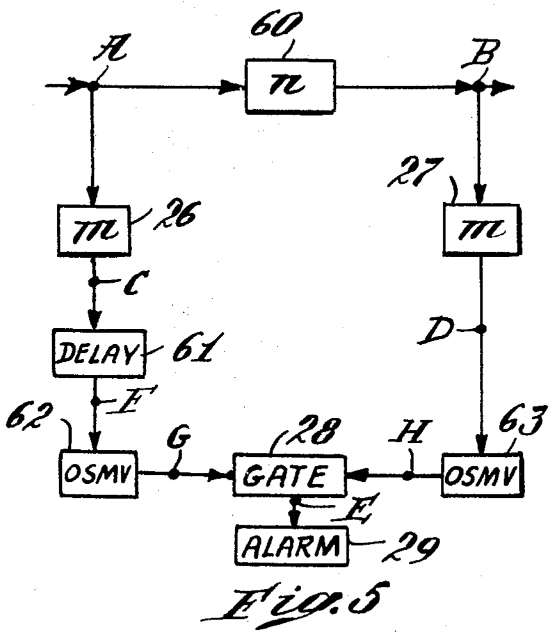
FIG. 5 is a schematic diagram of a fourth embodiment of the invention.

FIG. 5 illustrates other approaches to compensation which are desirable in some applications. Here a divider 60 is to be monitored. It is assumed that every $n$th pulse of the input at A which is to be passed to B, arrives there with a uniform phase lag, some jitter, and with an increase in width, these conditions continuing to point D after $m$ division by detector divider 27. If the signals at C and D were directly applied to coincidence gate 28, an error indication could unintentionally result. To insure that no mistaken indication is given, the signal at C obtained by way of 26 as in FIG. 1 is applied to a time delay circuit 61 which yields pulses at F in phase with corresponding pulses at D. The pulses at F and D are then applied respectively to pulse-shaping monostable or one-shot multivibrators 62 and 63, yielding pulses at G and H which are applied to coincidence gate 28. Multivibrator 62 increases the width of pulses at F, and multivibrator 63 decreases the width of pulses at D, eliminating the effects of jitter and width increase originating in frequency changer 60. It will be understood of course that multivibrator 62 should not increase pulse width to the extent that erroneous pulses will thereby be blocked in gate 28 and go undetected. FIG. 5 illustrates several compensating devices, and in many applications one or more of the delay 61 and multivibrators 62 and 63 will not be needed.

As hereintofore illustrated, each of the monitored frequency changers 20, 50 and 60 is a frequency divider of the digital pulse counting type. However, it should be clear that the error detectors 25, 25.1, 25A, etc. which have been described operate without regard to whether terminal A or terminal B has the higher frequency, so long as the gate 28, 28.1, 28A, etc. is inhibited by the higher frequency signal. Thus the error detector of this invention has application as well to frequency changers which are frequency multipliers.

Figure 6:
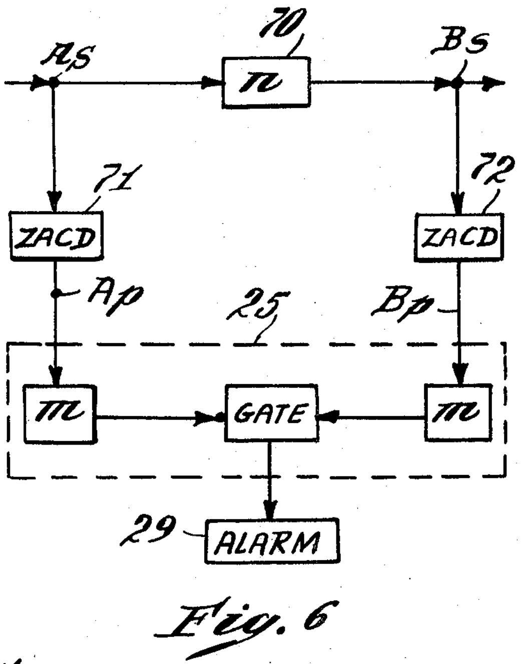
FIG. 6 is a schematic diagram of a fifth embodiment of the invention.
Figure 7:
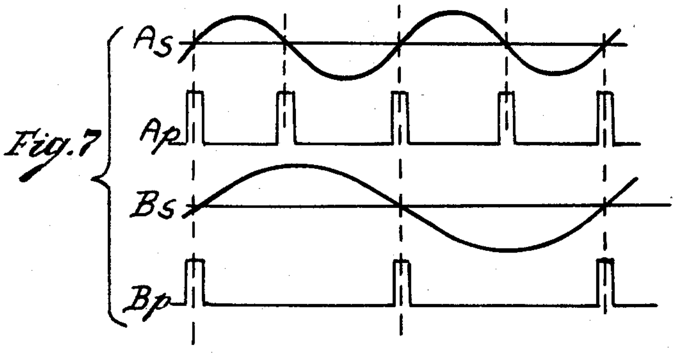
FIG. 7 is a graph illustrating signals at various points in the schematic of FIG. 6.
Figure 8:
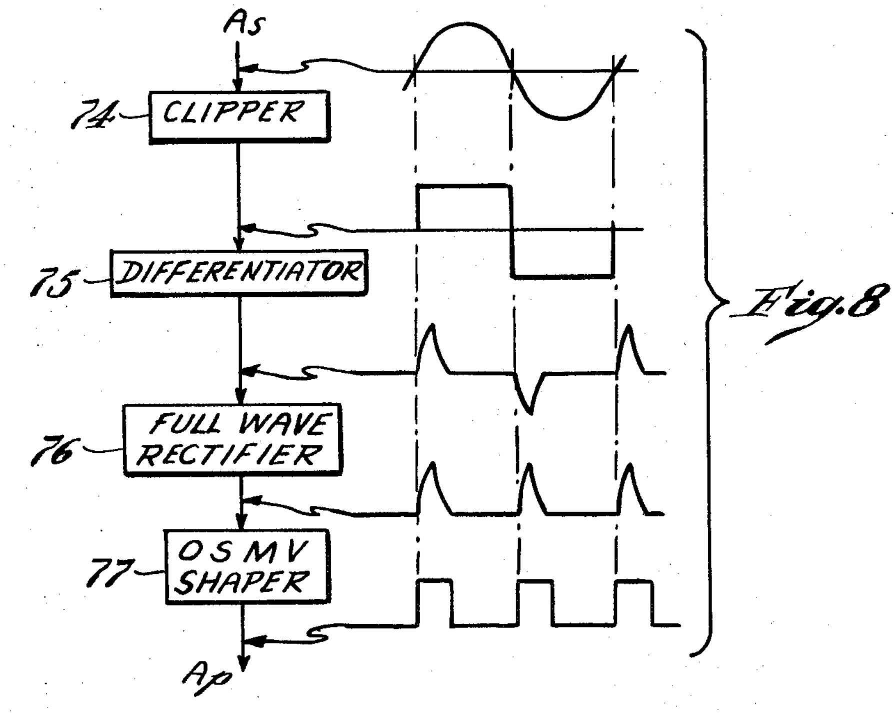
FIG. 8 is a schematic diagram of one form of zero axis crossing detector for use with the embodiment of FIG. 6.

The error detector of this invention also has application to sine wave frequency changers as illustrated in FIGS. 6, 7 and 8. FIG. 6 shows a sine wave frequency divider 70 with input terminal $A_s$, output terminal $B_s$, and division ratio $n$. The sine wave signals at $A_s$ and $B_s$ are respectively applied to means 71 and 72 which convert the sine wave signals to representative synchronous pulse signals of equal width at $A_p$ and $B_p$ respectively for application to error detector 25. Means 71 and 72 are, for example, zero-axis crossing detectors, which generate a pulse each time the sine wave changes polarity by crossing the zero axis.

FIG. 7 illustrates the operation of the circuit according to FIG. 6. The input and output sine waves are indicated at $A_s$ and $B_s$, it being assumed that $n=2$. The pulse inputs and outputs obtained with the zero axis crossing detectors are indicated at $A_p$ and $B_p$.

Zero axis crossing detectors of suitable construction are shown in FIG. 8, along with wave forms appearing at the points indicated. The zero axis crossing detector comprises a clipper 74 for converting the sine wave at $A_s$ to a square wave, a differentiator 75 for converting the square wave to alternating positive and negative pulses, a full wave rectifier 76 for converting negative to positive pulses, and a one shot multivibrator 77 for shaping rectified pulses into the desired width at $A_p$.

Figure 9:
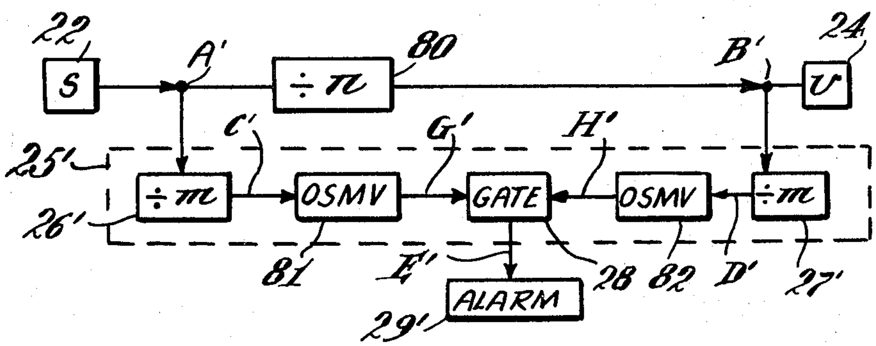
FIG. 9 is a schematic diagram of a sixth embodiment of the invention.
Figure 10:
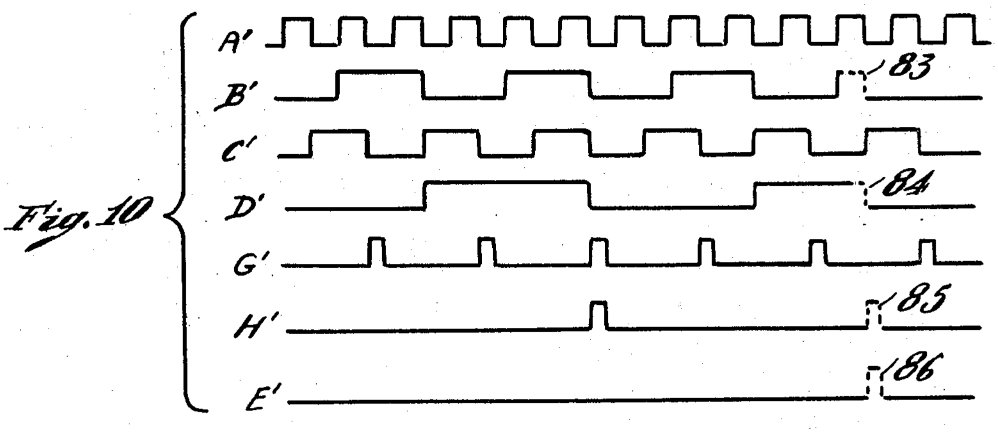
FIG. 10 is a graph illustrating signals at various points in the schematic of FIG. 9.

The frequency changers 20, 50 and 60, and detector dividers 26, 27, etc., have been illustrated in FIGS. 1 to 8 as being of the logic type responsive to the D.C. level of the input, and yielding output pulses having substantially the same width as the input pulses. Other logic devices used for changing frequency, however, are responsive to A.C. characteristics, for example the trailing edge of a pulse, and have a pulse output in which the frequency of the A.C. transition is of interest and in which the output pulses may have far greater width than input pulses to increase the energy of the output. Such a frequency divider also may be preferred for use with sine wave changers because a simple clipper or limiter may be used to convert the sine wave to a square wave directly useable by the divider, and the additional circuitry of FIG. 8 becomes unnecessary. It should be apparent that the error detector of this invention works equally well with this type of frequency changer circuitry provided that appropriate means responsive to the transition, such as conventional one shot multivibrators triggered by the transition, are used to produce gated and gating pulses for application to the gates 28, 28.1, 28A, etc. Such a circuit and its wave forms are illustrated in FIGS. 9 and 10, wherein frequency changer 80 with division ratio $n$, input terminal A′ and output terminal B′, is monitored by detector 25′ with input divider 26′ and ouput divider 27′ having division ratios of $m$ and output terminals C′ and D′ respectively. Monostable or one shot multivibrators 81 and 82 are responsive to selected transitions, e.g. negative transitions, in the signals at C′ and D′, and produce at terminals G′ and H′, respectively, pulse signals for application to coincidence gate 28′ which has output terminal E′ controlling alarm 29′. The pulses produced by multivibrator 81 should be, of course, of width equal to or greater than the width of pulses produced by multivibrator 82 to provide suitable blocking. FIG. 10 illustrates the signals at points A′, B′, C′, D′, E′, G′ and H′ in the circuit of FIG. 9 for the simple case of $n=3$, $n=2$, as in the example of FIG. 2. An erroneous transition 83 in the output B′ caused by noise, for example, will result in a misplaced transition 84 at D′. This will cause pulse 85 produced by multivibrator 82 to be non-coincident with the inhibiting pulses at G′, and the uninhibited pulse will pass through gate 28′ to E′ as 86 to activate alarm 29′.

Figure 11:
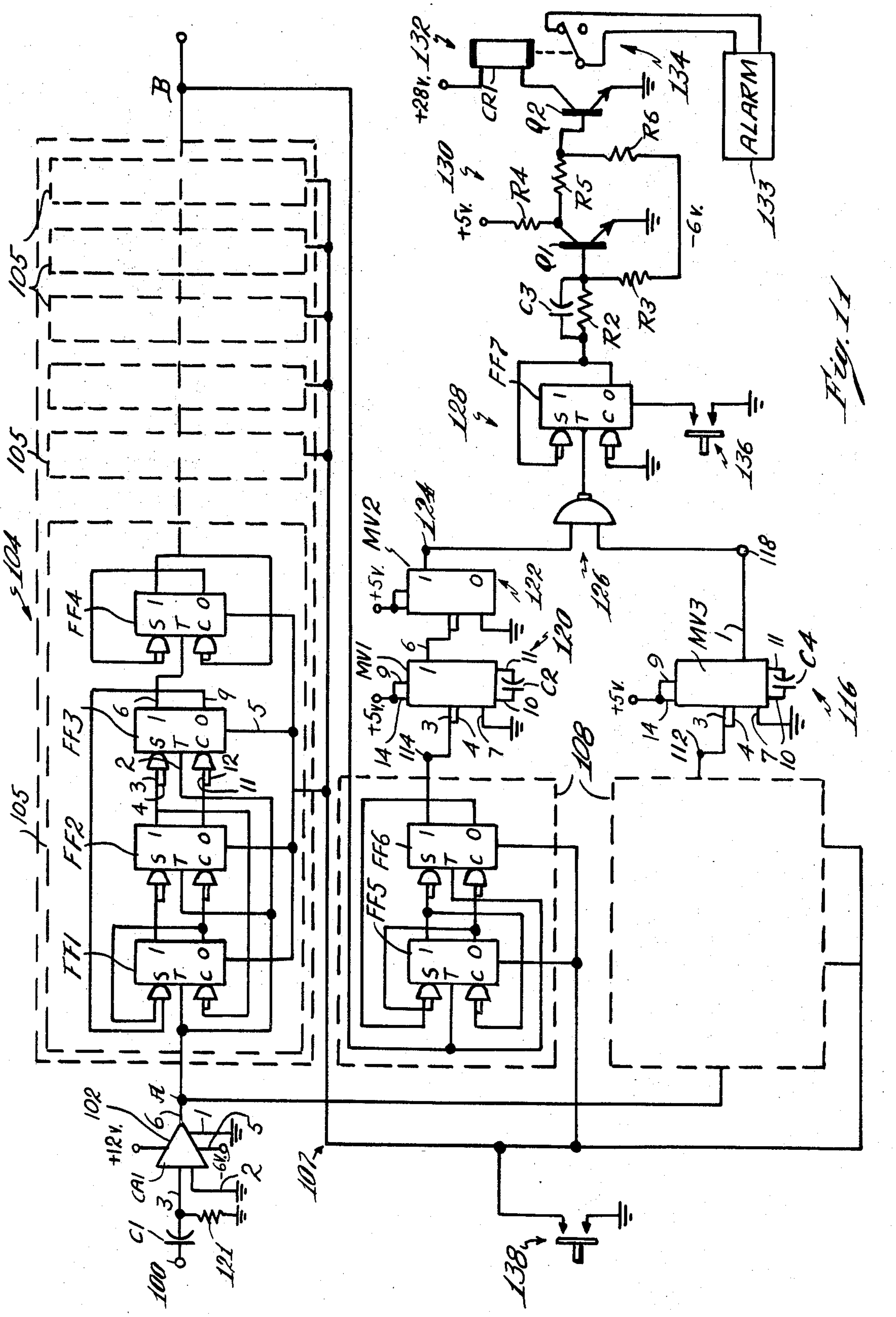
FIG. 11 is a circuit diagram showing in detail the circuitry of the embodiment according to FIG. 9.

The devices indicated by blocks in FIGS. 1 to 9 are generally speaking of conventional type, with suitable modifications for purposes of the invention. While those skilled in the art will readily appreciate the form of apparatus needed in each case, for a more complete description of a well working embodiment and for a better understanding of the invention, preferred constructions of certain elements, particularly suitable for purposes of the invention, are illustrated in FIG. 11. The incoming signal to be divided is here assumed to be a sinusoidal signal of 1 mHz. frequency, applied at terminal 100. Clipper amplifier 102 squares the signal and converts it to a pulse train of 1 mHz. frequency. The pulse train is applied at input terminal A of frequency divider 104 where it is counted down by a factor of 10 in each of six identical series decade dividers 105 therein, emerging at output terminal B as a 1 p.p.s. signal. The frequency divider 104 has, therefore, all $n_i=10$, $n=10^6$.

The error detector 107 receives the signals from terminals A and B, respectively, with two identical counters 108 which divide frequency by 3, a number having no factor in common with $10^6$, and deliver the signals to terminals 112, 114 as 333⅓ kp. p.s. and ⅓ p.p.s. signals respectively. The signal at terminal 112 goes to a one shot multivibrator 116, which yields inhibiting pulses of 400 ns. duration at terminal 118. The signal at terminal 114 goes to two serially connected one shot multivibrator 120, 122, the first of which functions as a delay and yields pulses of 200 ns. duration, and the second of which yields at terminal 124 pulses of 100 ns. duration at the conclusion of the 20 ns. pulses, roughly centered in the 400 ns. inhibiting pulse. The signals at termonals 118 and 124 are applied to coincidence gate 126, the output of which goes to trigger circuit 128 controlling amplifier 130 and relay 132. An alarm circuit 133 is actuated by relay switch 134 and remains actuated until reset switch 136 is closed to reset trigger 128. To enable all counters to be simultaneously reset after an error is detected, counter reset switch 130 is provided.

In this diagram of FIG. 11, appropriate power supply voltages are connected as indicated. The electrical connections of the circuit components are clearly shown in the drawing which is to that extent self-explanatory, while the appropriate structural characteristics, values, ratings or commercially accepted designations for each of the components are given in a list hereinbelow which refers to the numerals of the figure. For clarity, only one each of the counters 105 and 108 have been shown in detail and conventional 5 v. power supply and ground connections have been omitted from the logic elements therein, but it will be understood that the other counters 105 and 108 have the same construction as those shown. It will be understood that the specific values and ratings given are subject to adjustments applied upon initial and performance testing, according to routine practice in the manufacture of devices of this type. It will be further understood that the values as well as types of the various components are those of practical embodiments so that deviations therefrom are to be expected for other embodiments still within the scope of the invention.

In FIG. 11 the numerals 1 to 14 applied to a selected component of its respective type represent the "flat package type" terminal or pin numbers assigned by the manufacturer to various of the components in the following list which repeats the component designations of the figure.

| | |
|---|---|
| CA1 | Fairchild Semiconductor Co., logic device type "$\mu$A 710C." |
| FF1–FF7 | Fairchild Semiconductor Co., logic device type 'DT$\mu$L 945." |
| CG1 | One gate of Fairchild Semiconductor Co., logic device type "DT$\mu$L 946." |
| MV1–MV3 | Fairchild Semiconductor Co., logic device type "DT$\mu$L 951." |
| Q1 | Transistor, type "2N697." |
| Q2 | Transistor, type "2N656." |
| CR1 | Relay, 2K ohm winding. |
| C1 | .001 $\mu$fd. |
| C2 | 30 picofd. |
| C3 | 22 $\mu$fd. |
| C4 | 68 picofd. |
| R1 | 10K ohm. |
| R2 | 5.6K ohm. |
| R3 | 22K ohm. |
| R4 | 1K ohm. |
| R5 | 510 ohm. |
| R6 | 2.2K ohm. |

It should be understood that the present disclosure is for the purpose of illustration only and that this invention includes all modifications and equivalents which fall within the scope of the appended claims.

I claim:

1. An error detector for a frequency changer having associated therewith a higher frequency pulse signal and a lower frequency pulse signal, said higher frequency being $n$ times the lower frequency, comprising:
- a first frequency divider for dividing the higher frequency signal;
- a second frequency divider for dividing the lower frequency signal;
- the division ratios of said first and second dividers being prime relative to $n$;
- the fundamental period of the signal from the second divider being the shortest fundamental period common to the signals from the first and second dividers;
- means for inhibiting signals from the second frequency divider with signals from the first frequency divider; and
- error means responsive to uninhibited signals from the second frequency divider;
- whereby said error means provides indication of error in said frequency changer.

2. An error divider according to claim 1 wherein the division ratios of said first and second dividers are equal.

3. An error detector according to claim 1 wherein said inhibiting means includes a coincidence gate inhibited by signals from the first divider.

4. An error detector according to claim 1 further comprising pulse-shaping means for shaping the signals to be applied to said inhibiting means.

5. An error detector according to claim 4 wherein said pulse-shaping means comprises a monostable multivibrator for changing the width of said pulses.

6. An error detector according to claim 1 wherein said frequency changer and said first and second frequency dividers are digital pulse counters.

7. An error detector according to claim 1 wherein said error means comprises an alarm actuated by inhibited signals from the second frequency divider, means for maintaining said alarm actuated after it receives such signals, and means for resetting said alarm to a non-actuated state.

8. An error detector according to claim 1 further comprising means for resetting said first and second dividers to restore coincidence of signals therefrom after an error is detected.

9. An error detector according to claim 1 wherein said frequency changer is a sine wave changer having a sine wave input and a sine wave output and wherein said higher and lower frequency pulse signals are derived from said input and output with means producing pulse signals synchronous with said sine wave signals.

10. An error detector according to claim 9 wherein said synchronous pulse producing means comprises a zero-axis crossing detector.

11. An error detector for a frequency changer having associated therewith a higher frequency pulses signal and a lower frequency pulse signal, said higher frequency being $n$ times the lower frequency, comprising:

(1) a plurality of circuits each comprising:
   (a) a first frequency divider for dividing the higher frequency pulse signal;
   (b) a second frequency divider for dividing the lower frequency pulse signal;
   (c) the division ratios of said first and second frequency dividers being prime relative to $n$;
   (d) the fundamental period of the signal from the second divider being the shortest fundamental period common to the signals from the first and second dividers, whereby in the absence of error said signals coincide; and
   (e) means for inhibiting signals from the second divider with signals from the first divider;

(2) the division ratios of the dividers in each circuit being prime relative to the division ratios in each other circuit; and (3) means responsive to uninhibited signals from the second dividers of said circuits for providing a signal indicative of an error.

12. An error detector according to claim 11 wherein the divider ratios in each detector circuit are equal.

13. An error detector for a frequency changer having at least three serial stages, comprising a plurality of detector circuits for monitoring overlapping portions of said frequency changer, each portion including at least two stages and having associated therewith a lower frequency pulse signal and a higher frequency pulse signal of frequency $n_1$ times the lower frequency, the detector circuit for each portion comprising:

(1) first frequency divider means for dividing the higher frequency signal associated with a first portion, said first frequency divider means having a predetermined division ratio which is prime relative to the $n_1$ for said first portion;

(2) second frequency divider means for dividing the lower frequency signal associated with said first portion, said second frequency divider means having a predetermined division ratio that is prime to the $n_1$ for the first portion;

(3) the fundamental period of the signal from the second frequency divider means being the shortest fundamental period common to the signals from the first and second divider means, whereby in the absence of error in said first portion, said signals coincide;

(4) means for inhibiting signals from the second divider means with signals from the first divider means; and (5) means responsive to uninhibited signals from the second divider means of the detector circuits for providing a signal indicative of an error.

14. A method of detecting random errors introduced by apparatus for providing from an input signal including pulses at an input signal frequency, an output signal including pulses at an output signal frequency intended to be one *n*th of said input signal frequency, comprising:

(1) generating a first signal in response to the input signal, which first signal is of a frequency related to the input signal frequency by a number prime relative to *n*;

(2) generating a second signal in response to the output signal frequency, which second signal is of a frequency related to the output signal frequency by a number prime relative to *n*, and the fundamental period of the second signal frequency is the shortest fundamental period common to the first signal frequency and the second signal frequency;

(3) inhibiting the second signal with the first signal at all instances where the common period relationship exists; and (4) indicating the presence of error where the common period relationship ceases to exist.

15. The method according to claim 14 wherein the frequency of the first signal and the second signal are related respectively to the input signal frequency and the output signal frequency by the same number.

References Cited

UNITED STATES PATENTS

| | | | |
|---|---|---|---|
| 2,824,228 | 2/1958 | Carmichael | 235—92X |
| 3,196,258 | 7/1965 | Belcastro | 235—153 |
| 3,424,986 | 1/1969 | Vasseur | 235—92X |
| 3,443,070 | 5/1969 | Derby et al. | 235—92 |

MALCOLM A. MORRISON, Primary Examiner

C. E. ATKINSON, Assistant Examiner

U.S. Cl. X.R.

235—92; 307—225; 328—39; 340—146.1